United States Patent
Vasquez et al.

(10) Patent No.: US 6,239,701 B1
(45) Date of Patent: May 29, 2001

(54) VEHICLE LOCATOR LIGHT

(76) Inventors: Michael Vasquez; Angelo M. Vasquez, both of 5400 S. California, Chicago, IL (US) 60632

(*) Notice: Subject to any disclaimer, the term of this patent is extended or adjusted under 35 U.S.C. 154(b) by 0 days.

(21) Appl. No.: 09/390,758

(22) Filed: Sep. 7, 1999

(51) Int. Cl.⁷ .............................. G08B 1/08; G08C 19/00
(52) U.S. Cl. ................ 340/539; 340/425.5; 340/825.69; 116/209; 116/28 R
(58) Field of Search ........................ 340/539, 825.69, 340/825.72, 425.5, 825.49, 825.36; 116/209, 173, 28 R

(56) References Cited

U.S. PATENT DOCUMENTS

| | | | |
|---|---|---|---|
| 3,540,406 | 11/1970 | Dexter | 116/28 |
| 4,624,211 | * 11/1986 | Jokel | 116/209 |
| 4,633,215 | 12/1986 | Anders et al. | 340/84 |
| 5,140,933 | 8/1992 | Nishina et al. | 116/209 |
| 5,278,556 | * 1/1994 | Oh | 340/825.72 |
| 5,388,546 | 2/1995 | Lombard | 116/209 |
| 5,572,225 | 11/1996 | McCarthy | 343/720 |
| 5,636,588 | 6/1997 | Keller et al. | 116/209 |
| 5,933,081 | * 8/1999 | Jones | 340/539 |

* cited by examiner

*Primary Examiner*—Donnie L. Crosland
(74) *Attorney, Agent, or Firm*—Henderson & Sturm LLP

(57) ABSTRACT

A vehicle locator device comprising a battery/solar powered strobe light assembly having a reflector mirror and a variety of colored lenses to allow a user to select a predetermined color so as to assist the user in identifying their vehicle in a parking lot. The device is activated by remote control and includes a securing mechanism for locking the device to the end of an antenna.

4 Claims, 1 Drawing Sheet

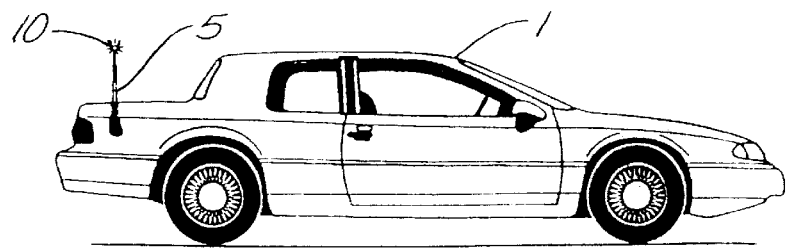
Fig. 1
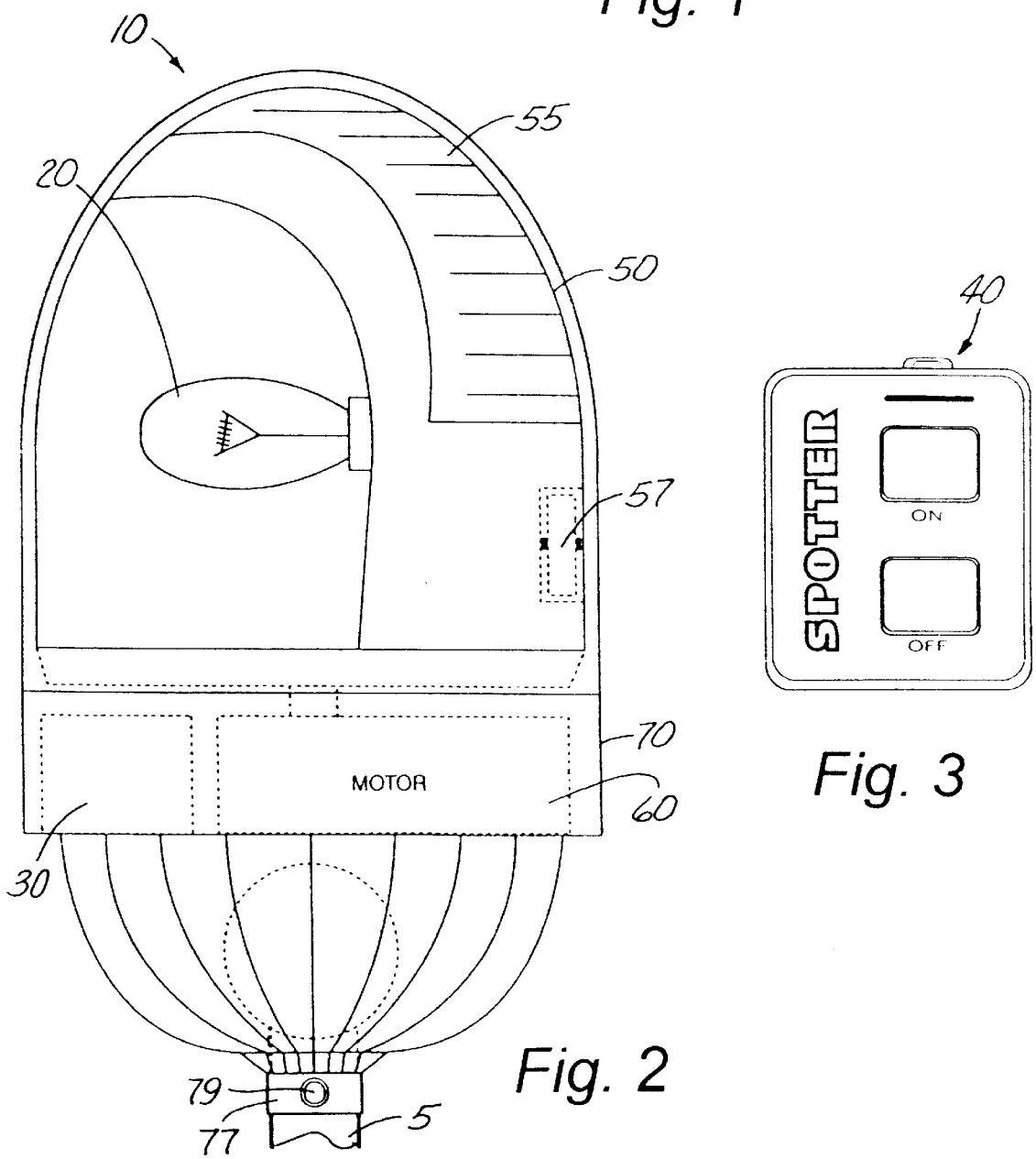
Fig. 2
Fig. 3

VEHICLE LOCATOR LIGHT

BACKGROUND OF THE INVENTION

1. Field of the Invention

The present invention relates to the field of vehicle accessories, and more particularly to a vehicle locator light.

2. Description of Related Art

As can be seen by reference to the following U.S. Pat. Nos. 3,540,406; 4,633,215; 5,140,933; 5,388,546; 5,572,225; and 5,636,588, the prior art is replete with myriad and diverse vehicle locating devices.

While all of the aforementioned prior art constructions are more than adequate for the basic purpose and function for which they have been specifically designed, they are uniformly deficient with respect to their failure to provide a simple, efficient, and practical vehicle locator light.

As a consequence of the foregoing situation, there has existed a longstanding need for a new and improved type of vehicle locator light, and the provision of such a construction is a stated objective of the present invention.

BRIEF SUMMARY OF THE INVENTION

Briefly stated, the present invention provides a vehicle locator device comprising a battery/solar powered strobe light assembly having a reflector mirror and a variety of colored lenses to allow a user to select a predetermined color so as to assist the user in identifying their vehicle in a parking lot. The device is activated by remote control and includes a securing mechanism for locking the device to the end of an antenna.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a side elevational view of a vehicle using the locator light of the present invention;

FIG. 2 is an enlarged side elevational view of the locator light attached to the to portion of a vehicle antenna; and FIG. 3 is a top plan view of a remote control used to activate the light and housing the rotating motor of the locator.

DETAILED DESCRIPTION OF THE INVENTION

As can be seen by reference to the drawings, and in particular to FIG. 1, the vehicle locator light that forms the basis of the present invention is designated generally by the reference number 10. The locator light 10 is an antenna mounted device with a small, bright strobe light 20 attached to the top. The strobe light 20 connects to a control box 30 which is activated by means of a small key fob type transmitter 40 similar to those used with vehicle alarms. When activated, the strobe light 20 lights up while the housing 50 rotates, creating the effect of a mini-lighthouse. Solar panels 55 on the roof of the housing 50, along with battery 57 powers a motor 60 in the base 70 allowing the housing 50 to spin with respect to the base 70. A remote transmitter 40 activates the light 20 and motor 60 by sending signal to a receiver 30 in base 70; it features a range of approximately 1/4 mile. The base 70 attaches to a vehicle's existing antenna 5 by means of an adjustable clip 77. The locator light 10 could be designed with a magnetic mount that could be placed on top of the vehicle I when required for use. As an option, housing 50 includes a variety of different colored lenses, which allow the user to customize the look of the strobe to their liking.

A driven gear that conforms to the overall diameter of the housing 50 is power rotated via a smaller driving gear that is attached to the drive shaft of a DC drive motor 60. A rechargeable Ni-Cad battery 57 powers the motor 60 and the light 20. The battery 57 is capable of being recharged by the solar cell panel 55 as mentioned previously. A gas discharge strobe light 28 with an associated driver electronics assembly is used as the high intensity light source for high visibility. An Allen type set screw 79 secures the clip 77 to the antenna 5 of a vehicle 1.

The remote transmitter unit 40 includes button style batteries that power it with keypad switches of the printed circuit board type that utilize a conductive type keypad that presses against a mating foil circuit on the electronic circuit board.

The design of the locator light 10 is that of a remotely controlled strobe light 20 mounted to a vehicle's antenna 5 for the purpose of providing a visible light to find one's car in a parking lot.

In use, the user installs the locator light 10 on his vehicle I with the adjustable antenna attachment clip 77 and enjoys the benefit of having a remotely controlled strobe light 20 that flashes brightly above his auto 1, allowing him to locate his vehicle 1 anytime he depresses the button on his remote key chain activation transmitter 40. Use of the locator light 10 provides a very practical and easy to use method of allowing one to quickly and easily locate his vehicle I without the hassle of walking through rows and rows of cars in a large or crowded parking lot.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A vehicle locator light, comprising:

a base including a clip disposed to engage a portion of an antenna;

a housing rotatably mounted on the base;

a light disposed within the housing;

a motor attached to the base and being drivably connected to the housing;

a battery attached to the base and being electrically coupled to the motor and the light;

a solar panel attached to the housing and being electrically coupled to the battery, the motor, and the light;

a remote signal receiving switch attached to the base and being electrically coupled to the motor and the light; and a remote signal transmitting control being electrically coupled to the switch, whereby the motor and light are selectively activated from a remote location.

2. The vehicle locator light of claim 1 wherein the light is a strobe light.

3. The vehicle locator light of claim 2 wherein a reflector mirror is disposed within the housing behind the strobe light.

4. The vehicle locator light of claim 3 wherein one of a plurality of colored lenses is selectively attached to the housing in front of the strobe light.

* * * * *